(12) United States Patent
Kang et al.

(10) Patent No.: US 11,734,284 B2
(45) Date of Patent: Aug. 22, 2023

(54) METHOD FOR LOADING DATA AND ELECTRONIC APPARATUS THEREFOR

(71) Applicant: Coupang Corp., Seoul (KR)

(72) Inventors: Young Shin Kang, Seoul (KR); Hong Gyem Kim, Seoul (KR); Sang Eun Kim, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/662,986

(22) Filed: May 11, 2022

(65) Prior Publication Data

US 2022/0269682 A1 Aug. 25, 2022

Related U.S. Application Data

(63) Continuation of application No. 17/153,268, filed on Jan. 20, 2021, now Pat. No. 11,360,985.

(30) Foreign Application Priority Data

Dec. 28, 2020 (KR) .................. 10-2020-0184925

(51) Int. Cl.
*G06F 16/00* (2019.01)
*G06F 16/2457* (2019.01)
*G06F 16/2458* (2019.01)
*G06F 16/25* (2019.01)
*H04L 67/55* (2022.01)

(52) U.S. Cl.
CPC .... *G06F 16/24573* (2019.01); *G06F 16/2471* (2019.01); *G06F 16/254* (2019.01); *H04L 67/55* (2022.05)

(58) Field of Classification Search
CPC .......... G06F 16/24573; G06F 16/2471; G06F 16/254; H04L 67/55

USPC .......................................................... 707/722
See application file for complete search history.

(56) References Cited

U.S. PATENT DOCUMENTS

| | | |
|---|---|---|
| 2010/0250677 A1 | 9/2010 | Kahan et al. |
| 2016/0105385 A1 | 4/2016 | Allen et al. |
| 2016/0343032 A1 | 11/2016 | DeWitt et al. |
| 2017/0201504 A1 | 7/2017 | Funk |
| 2019/0303485 A1 | 10/2019 | Teruya |
| 2020/0174966 A1* | 6/2020 | Szczepanik ............. G06F 16/13 707/707 |

(Continued)

FOREIGN PATENT DOCUMENTS

| | | |
|---|---|---|
| JP | 2018-521433 A | 8/2018 |
| JP | 2019-503140 A | 1/2019 |

(Continued)

OTHER PUBLICATIONS

Thielen, "Howto build a dada lake on Google Cloud Platform: Cloud Summit 2019" Nov. 6, 2019.

*Primary Examiner* — Alexandria Y Bromell
(74) *Attorney, Agent, or Firm* — Knobbe, Martens, Olson & Bear, LLP (57) ABSTRACT

The present disclosure relates to a method of loading data. The method includes checking a topic corresponding to a search word among a plurality of topics in response to acquiring a search word for a topic of a distributed messaging system from a user, checking a data format including one or more fields of a message loaded into a topic, and then loading data generated based on the checked data format and the read message into a data lake.

17 Claims, 11 Drawing Sheets

(56) References Cited

U.S. PATENT DOCUMENTS

2020/0304583 A1    9/2020  Ruiz-Meraz et al.
2021/0089526 A1    3/2021  Nixon et al.

FOREIGN PATENT DOCUMENTS

| | | |
|---|---|---|
| JP | 2020-154381 A | 9/2020 |
| JP | 6771503 B2 | 10/2020 |
| JP | 2021-057893 A | 4/2021 |
| KR | 10-2017-0081119 A | 7/2017 |
| KR | 10-2017-0122875 A | 11/2017 |
| KR | 10-1888131 B1 | 8/2018 |
| KR | 10-2019-0011353 A | 2/2019 |
| KR | 10-1948150 B1 | 2/2019 |

\* cited by examiner

Recent search history

○ 1 month ◉ 1week ○ 1 day ○ Period setting [ Inquiry ]

Inquiry result                                    Whether to select 20201220   17:00   order_complete        ☐
20201220   14:35   payment_complete    ☐
20201219   11:30   order_complete        ☐
                            ⋮

[ Apply ]

FIG. 5

Recent selected field history

○ 1 month  ⊙ 1week  ○ 1 day  ○ Period setting  [Inquiry]

Inquiry result

Whether to select 20201220   order_complete
           locationType
           watcheruserID
           workeruserID
           workerphone 20201219   payment_complete
           ⋮

[Apply]

METHOD FOR LOADING DATA AND ELECTRONIC APPARATUS THEREFOR

CROSS-REFERENCE TO RELATED APPLICATIONS

This application is a continuation of U.S. patent application Ser. No. 17/153,268, filed on Jan. 20, 2021, which claims priority to Korean Application No. 10-2020-0184925, filed Dec. 28, 2020, each of which is incorporated herein by reference in its entirety.

BACKGROUND

Technical Field

The present disclosure relates to a method of loading data of a distributed messaging system and an electronic apparatus therefor.

Description of the Related Art

Due to recent developments in IT technology, large amounts of data are being produced and consumed as the use of traffic, the Internet, and the like in companies increases. Accordingly, there is a growing demand for a messaging system capable of processing exponentially increasing traffic and event logs and a data management system capable of loading and managing a large amount of data.

Related Art: Korean Patent Laid-Open Publication No. 10-2019-0011353

Meanwhile, Apache KAFKA is a large-capacity real-time log processing system, and is a distributed messaging system that uses a publish/subscribe paradigm. Apache KAFKA is a system developed by LinkedIn, was released as open source in 2011, and includes a specialized architecture for large-capacity real-time log processing.

A data lake is a data storage space in which all types of data regardless of data type (for example, structured/unstructured data type) and models can be stored. An existing data warehouse can store only structured data, but a data lake can store all data including the unstructured data, and as a result, can efficiently process corporate data that is being mass-produced in various forms.

Therefore, in order to efficiently manage and process corporate data, a method of using a distributed messaging system and a data lake is emerging, and specifically, a method of efficiently loading data generated based on a message of a distributed messaging system into a data lake is required.

SUMMARY

Technical Goals

Embodiments disclosed herein are directed to providing an electronic apparatus and an operation method thereof. The technical goals to be achieved by the embodiments of the present disclosure are not limited to the technical goals described above, and other technical goals may be inferred from the following example embodiments.

Technical Solutions

According to a first example embodiment, there is provided a method of loading data of a distributed messaging system by an electronic apparatus, the method including checking a topic corresponding to a search word among a plurality of topics in response to acquiring the search word for a topic of a distributed messaging system from a user, displaying a list of data fields of a message loaded into the checked topic, checking a data loading format including one or more selected data fields based on selection information for the one or more data fields acquired from the user among data fields included in the list of data fields, reading the message loaded into the checked topic, and loading data for the read message into a data lake based on the checked data loading format.

According to a second example embodiment, there is provided an electronic apparatus for loading data of a distributed messaging system, the electronic apparatus including a memory which stores at least one instruction, and a processor which executes the at least one instruction to check a topic corresponding to a search word among a plurality of topics in response to acquiring the search word for a topic of a distributed messaging system from a user, display a list of data fields of a message loaded into the checked topic, check a data loading format including one or more selected data fields based on selection information for the one or more data fields acquired from the user among data fields included in the list of data fields, read the message loaded into the checked topic, and load data for the read message into a data lake based on the checked data loading format.

According to a third example embodiment, there is provided a computer-readable recording medium including a non-transitory recording medium on which a program allowing a computer to execute the above-described method is recorded.

Detailed content of other embodiments is described in a detailed description and illustrated in the accompanying drawings.

Effects

According to the present disclosure, an electronic apparatus allows a user to select a required data field from a message of a distributed messaging system to generate data according to a predetermined read cycle and loads the generated data into a data lake, and thus the user can easily process the data and load the processed data into the data lake. In addition, the loaded data can be provided in various forms, and as a result, the time for data analysis can be saved.

Effects of the present disclosure are not limited to the above-described effects, and other effects that are not described will be clearly understood by those skilled in the art from the scope of the claims.

DETAILED DESCRIPTION

Terms that are currently widely used are selected as terms used in embodiments in consideration of functions in the present disclosure, but may be changed depending on the intention of those skilled in the art or a judicial precedent, the emergence of a new technique, and the like. In addition, in specific cases, there may be terms arbitrarily chosen by the applicant. In this case, the meaning of such a term will be described in detail in a corresponding description portion. Therefore, the terms used in the present disclosure should be defined on the basis of the meanings of the terms and the content throughout the present disclosure rather than the simple names of the terms.

Throughout the specification, unless otherwise specified, "including" any component means that other components may be further included rather than excluding other components. In addition, the terms "unit," "module," and the like, described in the specification refer to a processing unit of at least one function or operation and may be implemented by hardware or software or a combination of hardware and software.

The expression "at least one of a, b, and c" described throughout the specification may include "a alone," "b alone," "c alone," "a and b," "a and c," "b and c," or "all of a, b, and c."

A "terminal" described below may be implemented as a computer or a portable terminal that may access a server or other terminals through a network. Here, computers may include, for example, a notebook, a desktop, a laptop, and the like, which are equipped with a web browser, and portable terminals are wireless communication devices that ensure portability and mobility, and may include, for example, International Mobile Telecommunications (IMT), code division multiple access (CDMA), W-code division multiple access (W-CDMA), and Long Term Evolution (LTE) terminals, and all kinds of handheld-based wireless communication devices, such as a smartphone and a tablet PC.

In the following description, example embodiments of the present disclosure will be described in detail with reference to the drawings so that those skilled in the art can easily carry out the present disclosure. However, the present disclosure may be implemented in various different forms but it is not limited to the exemplary embodiments described herein.

Hereinafter, example embodiments of the present disclosure will be described with reference to the drawings.

Figure 1:
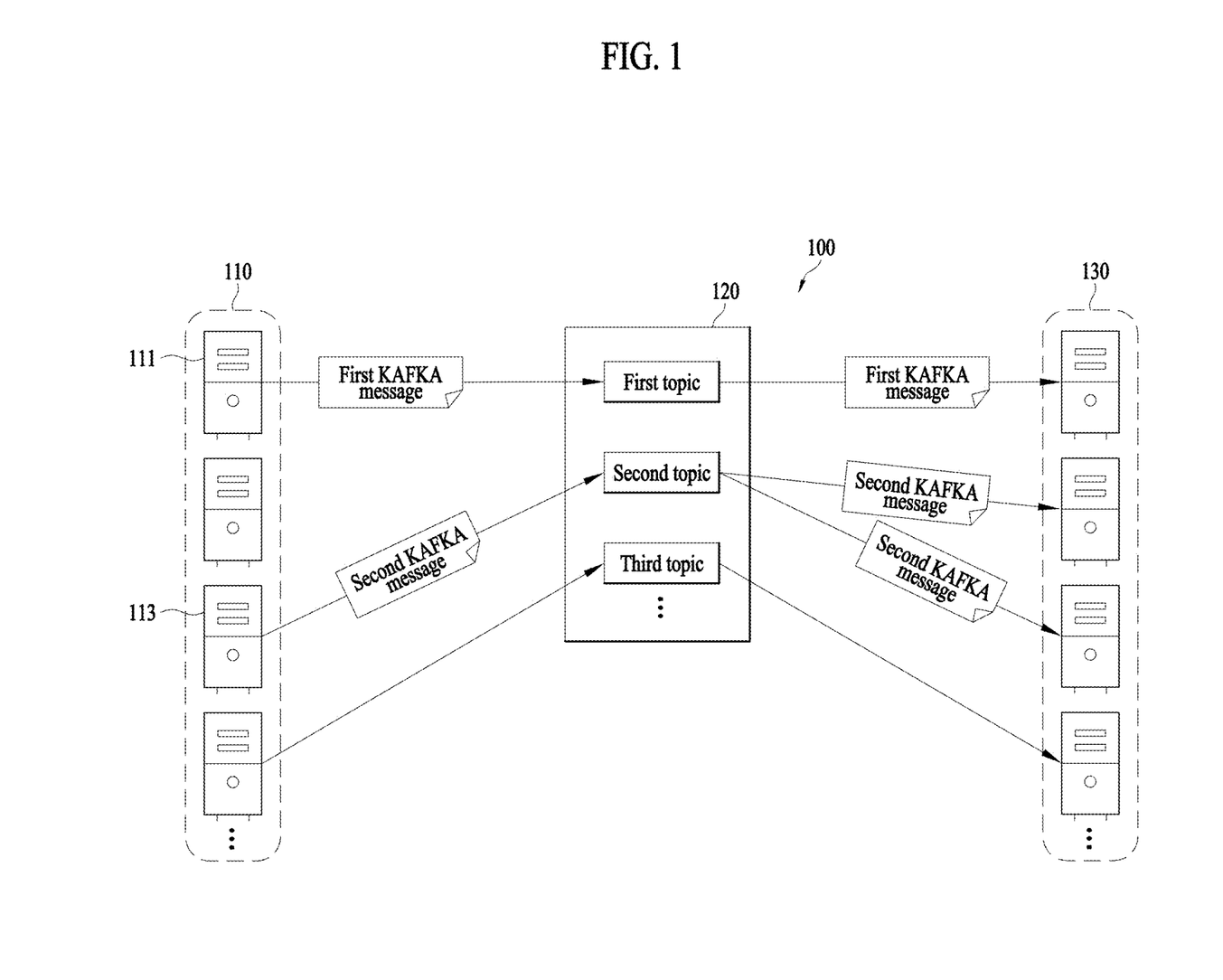
FIG. 1 is a diagram illustrating a KAFKA system according to an example embodiment.

FIG. 1 illustrates a KAFKA system according to an example embodiment.

Referring to FIG. 1, a KAFKA system 100 operates based on a publish-subscribe model and may include a message publisher 110, a broker 120, and a subscriber 130. Meanwhile, in an embodiment, a method of operating an electronic apparatus is described based on the KAFKA system 100, but the disclosed method may be commonly applied in a distributed messaging system based on a publish-subscribe model.

When an event occurs, the message publisher 110 may publish a KAFKA message for the event and transmit the published KAFKA message to the broker 120. In this case, the KAFKA message may include one or more data field values, and two or more KAFKA messages may include different data field values. For example, when an event such as "customer's item order" occurs, a first message publisher 111 may publish a KAFKA message for the "customer's item order." In this case, the published KAFKA message may include data field values for an ID of an order customer, an order item, an order date, and delivery destination information. Here, the data field of the KAFKA message may be determined through negotiation between the message publisher 110 and the subscriber 130 who subscribes to a corresponding topic.

Meanwhile, the broker 120 may classify KAFKA messages published by the message publisher 110 by topic, and load and manage the classified KAFKA messages. The KAFKA message may correspond to one topic. Accordingly, the KAFKA message may be loaded into the corresponding topic. For example, the first KAFKA message of FIG. 1 may be a message corresponding to a first topic, and the second KAFKA message may be a message corresponding to a second topic. In this case, the first KAFKA message may be published by the first message publisher 111 and then may be loaded into the first topic of the broker 120, and the second KAFKA message may be published by a third message publisher 113 and then may be loaded into the second topic of the broker 120.

Thereafter, the subscriber 130 who subscribes to the topic may read the KAFKA message from the topic of the broker 120 and may process the read KAFKA message. In this case, there may be multiple subscribers 130 who subscribe to one topic.

Meanwhile, the message publisher 110 may notify of the publication fact after publishing the KAFKA message. In this case, the subscriber 130 may determine whether to subscribe to a corresponding topic after checking the content of the notification. Thereafter, when the KAFKA message is published and loaded into the corresponding topic, subscribers may read the KAFKA message loaded into the corresponding topic.

The KAFKA system 100 is designed so that the broker 120 is configured as a cluster to operate for scale-out and high availability. In this case, even when there is only one broker 120, the broker 120 may operate as a cluster. The KAFKA system 100 has the above-described advantages, is useful for transmitting and receiving data between platforms, and is currently being used by a large number of companies.

Since the KAFKA system 100 publishes a volatile KAFKA message whenever an event occurs, a method of managing a large amount of data included in the published KAFKA message is required.

Meanwhile, when a large amount of data is managed through a database, a query process needs to be performed whenever data is required, and thus a problem of increasing computational complexity may occur. Therefore, in a data management system based on a data lake capable of storing all types of data regardless of data types, a method of efficiently loading data that may be obtained by processing messages of a distributed messaging system such as the KAFKA system is required.

Meanwhile, in the case of the KAFKA system in the example embodiment, since data may be consumed by a subscriber who subscribes to a corresponding topic, it may be difficult for a user who is not a subscriber to access the data. However, in the case of the data lake, it is relatively easy for users to access data, and as a result, the access convenience of data loaded into the data lake in the KAFKA system according to the example embodiment of the present specification is improved.

Figure 2:
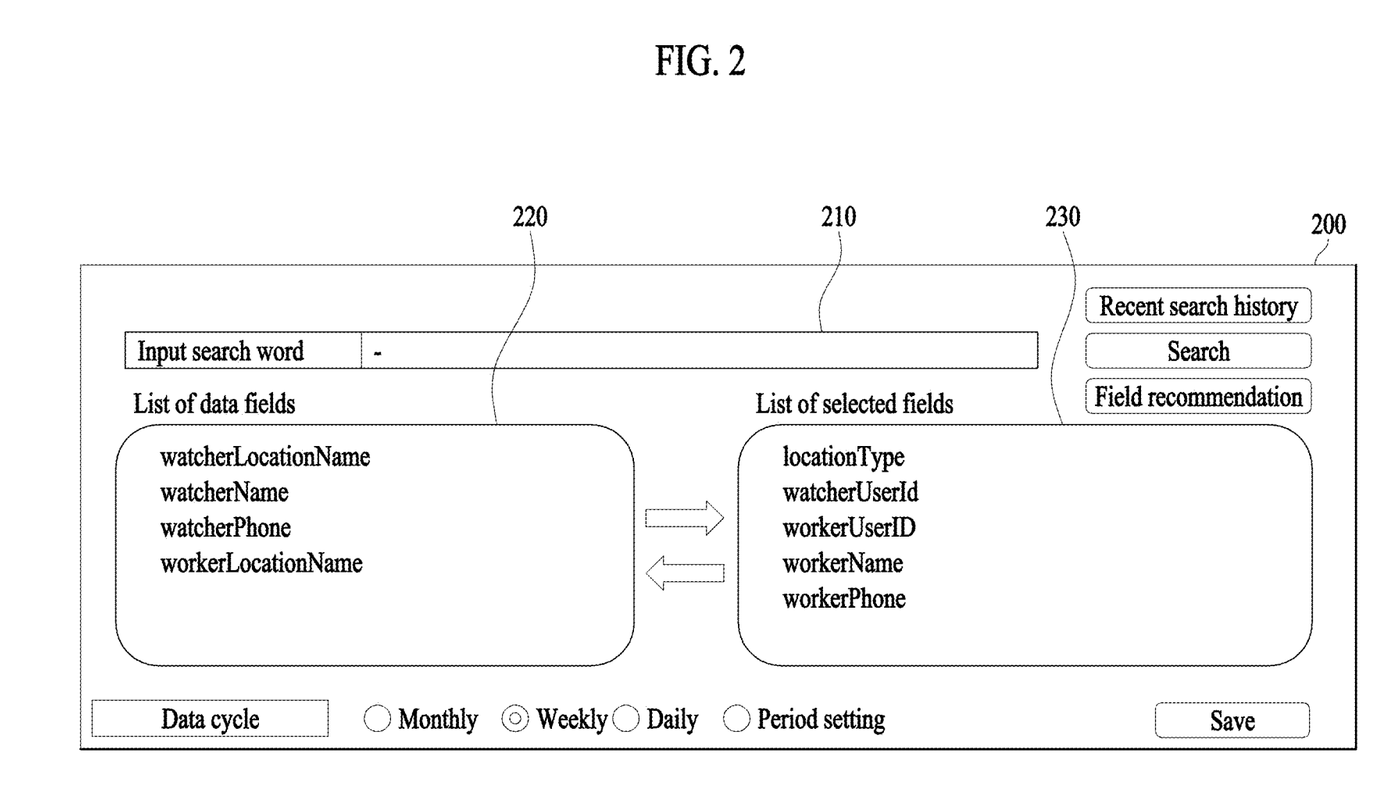
FIG. 2 is a diagram for describing a user interface provided by an electronic apparatus according to an example embodiment.

FIG. 2 is a diagram for describing a user interface provided by an electronic apparatus according to an example embodiment.

An electronic apparatus for loading data of a distributed messaging system according to the example embodiment of the present disclosure may provide a user interface 200 illustrated in FIG. 2 to a user terminal. Here, a user terminal may be defined as a terminal of a subscriber who wants to subscribe to a specific topic of the KAFKA system 100 and may be a terminal of a user who wants to process data of a distributed messaging system and load the processed data into a data lake.

When users input a search word for a topic, the user interface 200 may check (or search) a topic corresponding to the search word, select some data fields of a message loaded into the checked topic, and check a data loading format. Thereafter, the KAFKA message loaded into the identified topic may be read, processed according to the data loading format, and then loaded into the data lake. In an embodiment, the data loading format may include information associated with selecting field values to be loaded into the data lake among data field values included in the KAFKA message. For example, the electronic apparatus may load the field values corresponding to some fields selected according to the data loading format among the KAFKA messages into the data lake.

Referring to FIG. 2, the user interface 200 may provide an area 210 in which an input for a search word for a topic may be received from a user. When the user inputs the search word and then presses a search button, the user interface 200 may check whether the topic corresponding to the search word is there. In addition, the user interface 200 may display a check result on a screen.

In addition, the user interface 200 may display a list 220 of data fields of the KAFKA message loaded into the checked topic. In addition, when the selection information is received from the user for some of the data fields included in the list 220, a list 230 of the selected data fields may be displayed.

Meanwhile, when a user presses a save button, the data loading format including the selected data field may be stored. When a signal for the user's read cycle (or data cycle) is received, the KAFKA messages loaded into the topic in the future may be automatically read according to the received read cycle, and data including the data field selected according to the stored data loading format may be generated. The data thus generated may be loaded into the data lake.

Meanwhile, it is obvious to those skilled in the art that the data field and the read cycle illustrated in FIG. 2 are only exemplary and may be changed according to the implementation content of the system.

Figure 3:
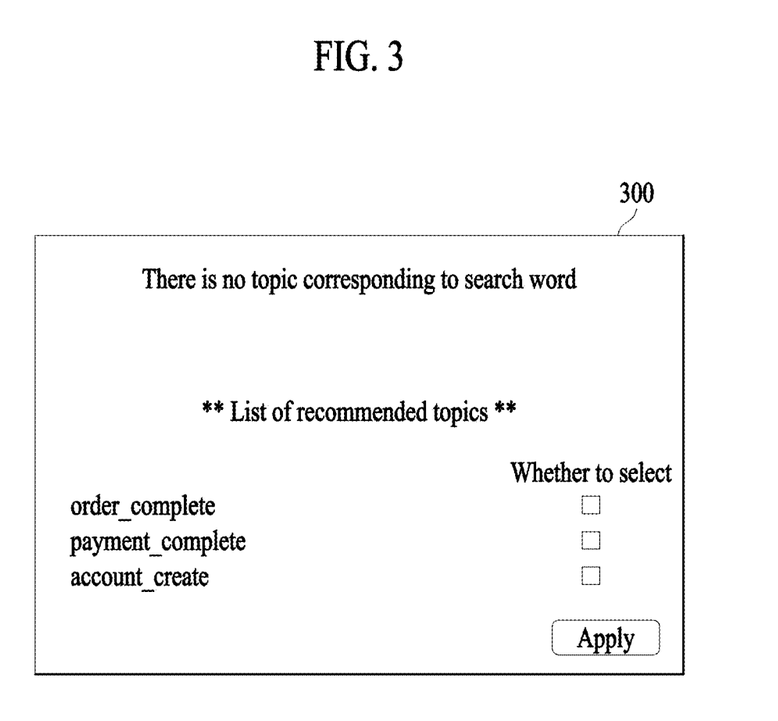
FIG. 3 is a diagram for describing recommending a topic according to an example embodiment.

FIG. 3 is a diagram for describing an embodiment of recommending a topic.

According to the example embodiment, when there is no topic corresponding to the search word input by the user, a user interface 300 may display a message notifying of this fact and may display some of the topics existing in the broker 120 as recommended topics. Specifically, when there is a topic having a similarity of 80% or more to a search word input by a user, the method of the present disclosure may include displaying the corresponding topic as a checked (or retrieved) topic. Also, when the similarity is less than a predetermined threshold, it may be determined that the topic corresponding to the search word does not exist.

Referring to FIG. 3, a user may select one or more topics from a list of recommended topics, and the user interface 200 may display the list of data fields of the KAFKA message loaded into the selected topic.

Meanwhile, it has been described that the similarity between the search word and the corresponding topic is 80% or more, but the similarity value is not limited thereto.

Figure 4:
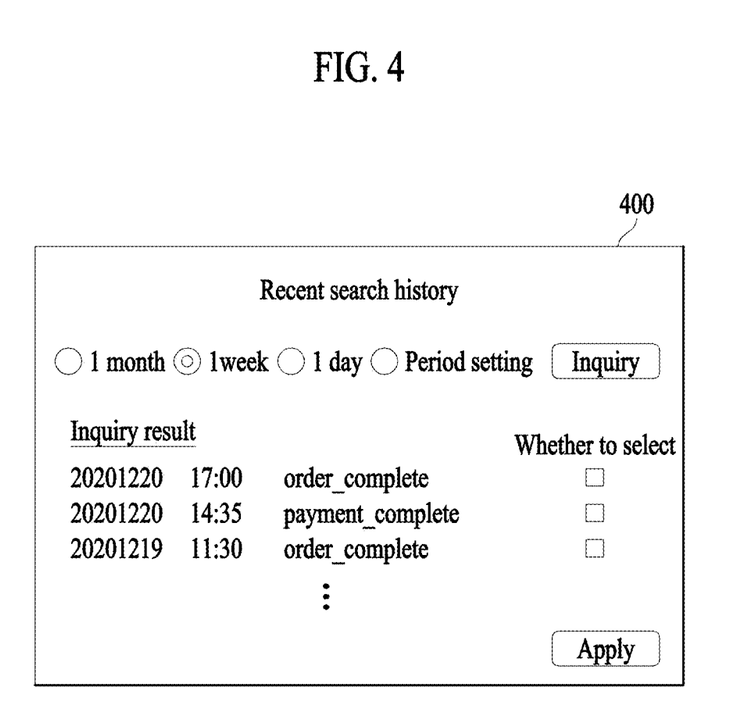
FIG. 4 is a diagram for describing displaying a recent search history according to an example embodiment.

FIG. 4 is a diagram for describing an embodiment of displaying a recent search history.

According to the example embodiment, a user interface 400 may provide information associated with a topic recently checked (or retrieved) by a user within a predetermined time.

Referring to FIG. 4, a user may set a period of inquiry for a search history. For example, the user may select a period of inquiry for the search history as one of 1 month, 1 week, and 1 day and may directly input the inquiry period through a period setting menu. Meanwhile, it is also possible to provide the search history within a preset inquiry period without the user input for the inquiry period.

Thereafter, the user interface 400 may display an inquiry result according to the inquiry period. In this case, the search history may display information on the date and time when each topic is retrieved. Here, the user may select one or more topics from the inquired topics, and the user interface 200 may display the list of data fields of the KAFKA message loaded into the selected topic.

Figure 5:
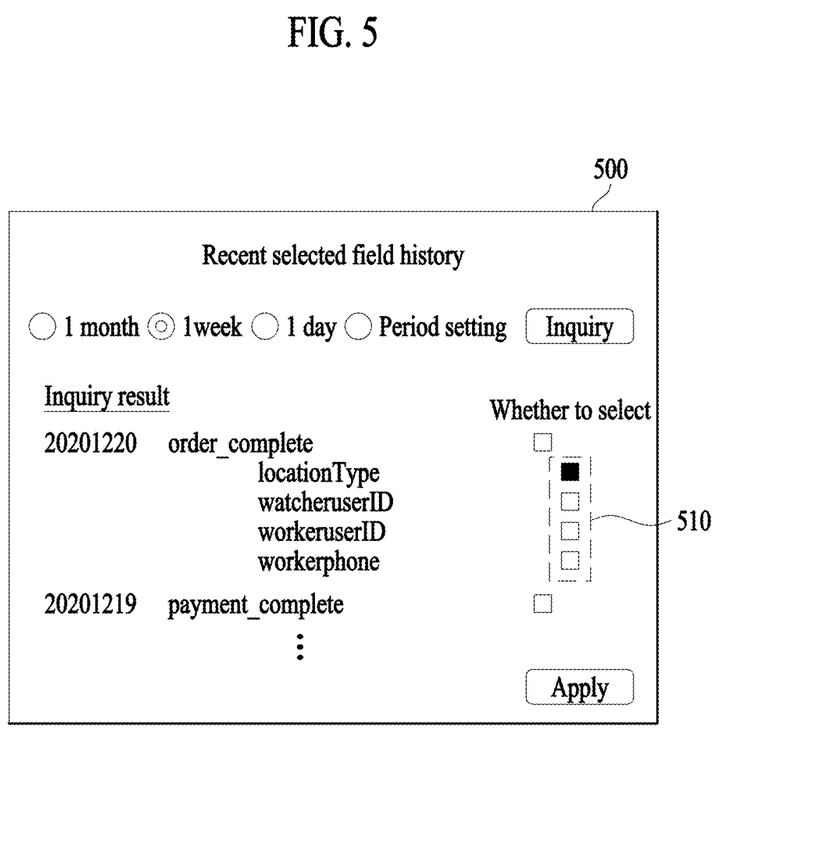
FIG. 5 is a diagram for describing displaying a history for a recently selected data field according to an example embodiment.

FIG. 5 is a diagram for describing an embodiment of displaying a history for a recently selected data field.

According to the example embodiment, a user interface 500 may provide information on or regarding a data field recently selected by a user within a predetermined time.

Referring to FIG. 5, a user may set a period of inquiry for a search history. Meanwhile, it is also possible to provide the search history within the preset inquiry period without the user input for the inquiry period.

Thereafter, the user interface 500 may display a history of selected data fields according to the inquiry period. Referring to FIG. 5, the user interface 500 may provide an area 510 in which four data fields (locationType, watcheruserID, workeruserID, and workerPhone) selected from data fields of a KAFKA message (order_complete) are loaded into a topic retrieved on Dec. 20, 2020, and a user input for these four data fields may be received on the area 510. In this case, when the user selects the data field locationType, the user interface 200 may add the locationType to the selected data field.

When the field value of the data field (locationType in FIG. 5) selected in the user interface 500 of FIG. 5 does not exist in the KAFKA message loaded into the topic retrieved in the user interface 200, the user interface 200 may additionally display a message notifying that the field value of the data field (locationType in FIG. 5) does not exist in the KAFKA message loaded into the retrieved topic. In addition, in another embodiment, the user interface 500 may lock a button so that the user may not select the data field for the data field value that does not exist in the KAFKA message loaded into the topic retrieved in the user interface 200 of FIG. 2 from the inquired data fields.

Meanwhile, the user interfaces 300 to 500 of FIGS. 3 to 5 may be displayed in a pop-up form of the user interface 200 of FIG. 2 and may be displayed in one area of the user interface 200 of FIG. 2, but the display method is not limited thereto.

Figure 6:
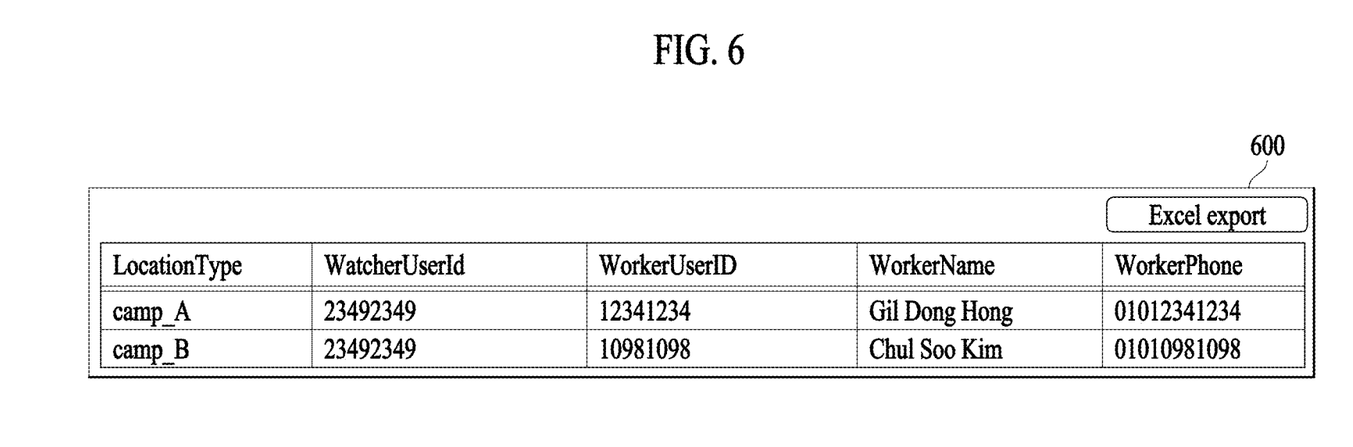
FIG. 6 is a diagram for describing providing information on or regarding data loaded into a data lake according to a first example embodiment.

FIG. 6 is a diagram for describing a first example embodiment of providing information on or regarding data loaded into a data lake.

According to the example embodiment, a user interface 600 may display the data loaded into the data lake in a table form.

Referring to FIG. 6, data including values of data fields (locationType, watcherUserID, workerUserID, workerName, and workerPhone) selected by a user may be loaded into the data lake. The data illustrated in FIG. 6 may be generated by processing a read KAFKA message according to a read cycle selected by a user.

In addition, the user interface 600 may provide a function of exporting the data loaded into the data lake in a form executable by another application. Referring to FIG. 6, the user interface 600 may display an Excel export button and extract the data loaded into the data lake as an Excel file based on a user input.

Meanwhile, although FIG. 6 illustrates an example of a function of exporting data in an Excel file format, the export function is not limited thereto, and it is obvious to a person skilled in the art that the export function may be a form executable in various applications.

Figure 7:
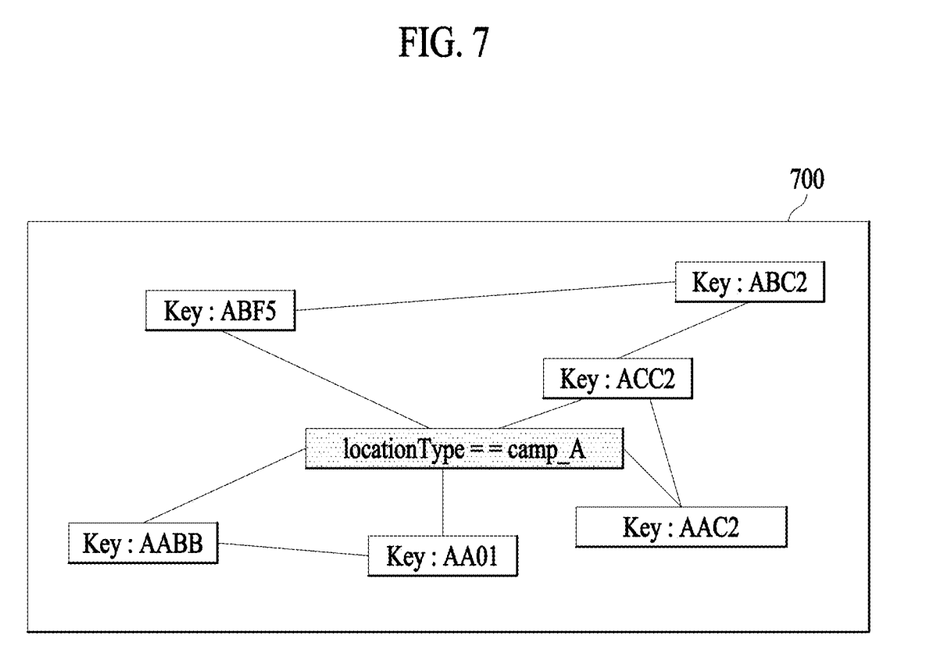
FIG. 7 is a diagram for describing providing information on or regarding data loaded into a data lake according to a second example embodiment.

FIG. 7 is a diagram for describing a second example embodiment of providing information regarding data loaded into a data lake.

According to the example embodiment, a user interface 700 may provide the data loaded into the data lake in a grid form.

Referring to FIG. 7, the user interface 700 may provide, in the grid form, data having the same data field locationType as camp_A among the data loaded into the data lake. In this case, each piece of data may be identified as a key value. In addition, each piece of data may be connected to data having the same data field value. For example, data having a key value of ABF5 and data having a key value of ABC2 may be data having the same value of the data field watcherUserID.

In this case, the data displayed in the grid form may be data generated based on the KAFKA message loaded into the same topic or data generated based on the KAFKA message loaded into different topics including the field values of the same data field.

Figure 8:
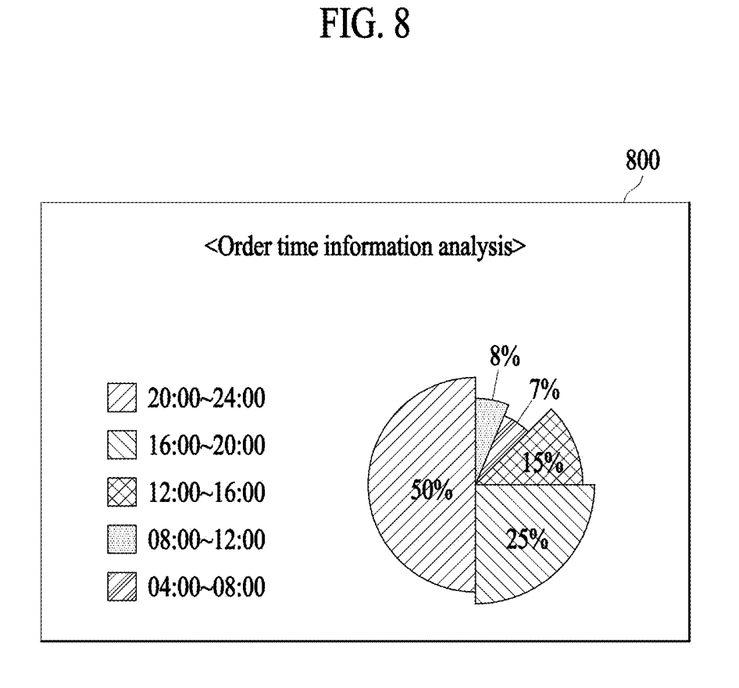
FIG. 8 is a diagram for describing providing information on or regarding data loaded into a data lake according to a third example embodiment.

FIG. 8 is a diagram for describing a third example embodiment of providing information regarding data loaded into a data lake.

According to the example embodiment, a user interface 800 may provide the data loaded into the data lake in a graphic form.

For example, the method of the present disclosure may include generating order-related data by reading a KAFKA message loaded into an order-related topic. In addition, the generated data may be loaded into the data lake. In this case, the method of the present disclosure may include graphing a ratio of an order time as illustrated in the user interface 800 of FIG. 8 on the basis of the order time included in the order-related data and provide the graphed ratio of the order time to the user.

Meanwhile, the user interface 800 may display data in a different graph form other than the graph type illustrated in FIG. 8 according to data types, such as a bar graph or a line graph.

In addition, the user interfaces 600 to 800 of FIGS. 6 to 8 may be displayed in a pop-up form of the user interface 200 of FIG. 2 and may be displayed in one area of the user interface 200 of FIG. 2, but the display method is not limited thereto.

Figure 9:
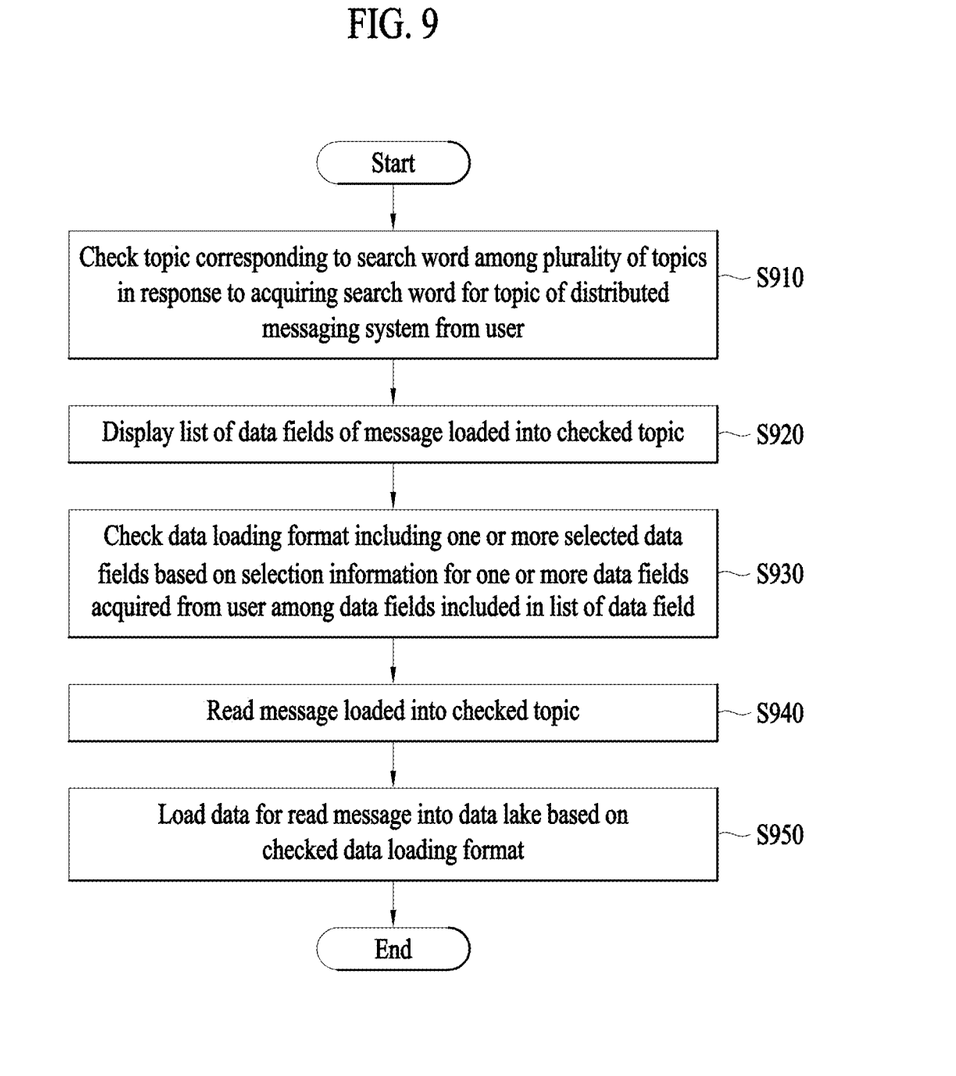
FIG. 9 is a flowchart for describing a method of loading data of a distributed messaging system according to an example embodiment.

FIG. 9 is a flowchart for describing a method of loading data of a distributed messaging system according to an example embodiment.

In operation S910, the method of the present disclosure may check a topic corresponding to a search word among a plurality of topics in response to acquiring a search word for a topic of a distributed messaging system from a user.

In operation S920, the method of the present disclosure may display a list of data fields of a message loaded into the checked topic.

In operation S930, the method of the present disclosure may check a data loading format including one or more selected data fields based on selection information for one or more data fields acquired from the user among data fields included in the lists of data field.

In operation S940, the method of the present disclosure may read the message loaded into the checked topic.

Meanwhile, the method of the present disclosure may further include an operation of receiving a selection signal for a read cycle from the user. In this case, operation S940 may be an operation of automatically reading the message according to the read cycle after the selection signal for the read cycle is received.

In operation S950, the method of the present disclosure may load the data for the read message into the data lake based on the checked data structure.

Meanwhile, the method of the present disclosure may further include an operation of displaying a check result of the topic corresponding to the search word.

In addition, the method of the present disclosure may further include an operation of recommending one or more topics based on the search word, in addition to the check result of the topic corresponding to the search word.

Meanwhile, the method of the present disclosure may further include an operation of displaying the data loaded into the data lake in a table form.

In addition, the method of the present disclosure may further include an operation of displaying the data loaded into the data lake in at least one of a grid form and a graphic form.

Meanwhile, the method of the present disclosure may further include an operation of exporting the data loaded into the data lake in a form executable by another application.

In addition, the method of the present disclosure may further include an operation of providing information on a data loading format recently stored before a predetermined time.

In addition, the method of the present disclosure may further include an operation of providing the information on the data recently loaded into the data lake before the predetermined time.

In addition, the method of the present disclosure may further include an operation of providing the information on the topic recently checked before a predetermined time.

Meanwhile, the message may be published in response to receiving event information and loaded on a corresponding topic.

In addition, the method of the present disclosure may further include an operation of notifying that the message is published, and the message may be read after a subscriber who subscribes to the corresponding topic receives the notification.

In this case, the method of the present disclosure may further include an operation of broadcasting the information on the data generated from the read message.

Figure 10:
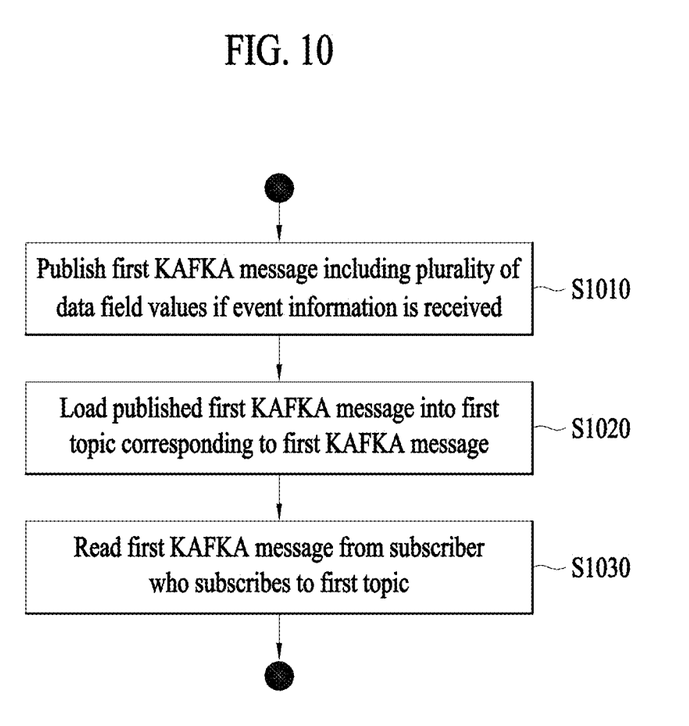
FIG. 10 is a flowchart for describing a method of loading data of a distributed messaging system according to another example embodiment.

FIG. 10 is a flowchart for describing a method of loading data of a distributed messaging system according to another example embodiment.

The method according to the example embodiment may broadcast a KAFKA message published by a message publisher to a subscriber.

Specifically, in operation S1010, when event information is received, the method of the present disclosure may publish a first KAFKA message including a plurality of data field values.

In operation S1020, the method of the present disclosure may load the published first KAFKA message into a first topic corresponding to the first KAFKA message.

In operation S1030, in the method of the present disclosure, a subscriber who subscribes to the first topic may read the first KAFKA message from the first topic.

Figure 11:
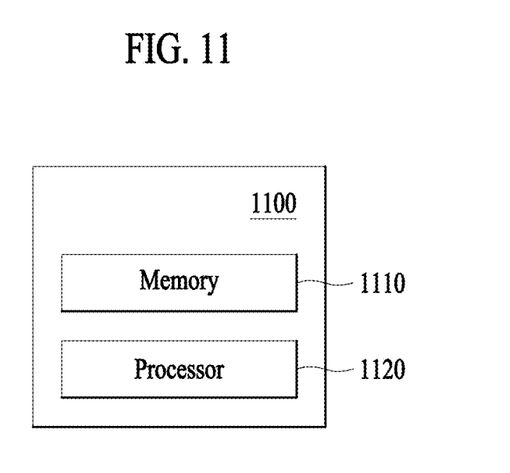
FIG. 11 is a block diagram of an electronic apparatus according to an example embodiment.

FIG. 11 is a block diagram of an electronic apparatus according to an example embodiment.

An electronic apparatus 1100 may include a memory 1110 and a processor 1120 according to the example embodiment. In the electronic apparatus 1100 illustrated in FIG. 11, only components related to the present embodiment are illustrated. Accordingly, it can be understood by those of ordinary skill in the art related to the present embodiment that other general-purpose components may be further included in addition to the components illustrated in FIG. 11.

The memory 1110 is hardware that stores various types of data processed in the electronic apparatus 1100. For example, the memory 1110 may store data that has been processed and data that will be processed by the electronic apparatus 1100. The memory 1110 may store at least one instruction for an operation of the processor 1120. In addition, the memory 1110 may store programs, applications, or the like to be driven by the electronic apparatus 1100. The memory 1110 may include a random access memory (RAM) such as a dynamic RAM (DRAM) or a static RAM (SRAM), a read-only memory (ROM), an electrically erasable programmable ROM (EEPROM), a compact disc (CD)-ROM, a Blu-ray or other optical disc storage, a hard disk drive (HDD), a solid state drive (SSD), or a flash memory.

The processor 1120 may control the overall operation of the electronic apparatus 1100 and process data and signals. The processor 1120 may generally control the electronic apparatus 1100 by executing at least one instruction or at least one program stored in the memory 1110. The processor 1120 may be implemented by a central processing unit (CPU), a graphics processing unit (GPU), an application processor (AP), or the like, but is not limited thereto.

The processor 1120 may check a topic corresponding to a search word among a plurality of topics in response to acquiring the search word for the topic of the distributed messaging system from the user and display a list of data fields of a message loaded into the checked topic. In addition, among the data fields included in the list of data fields, the data loading format including one or more data fields selected based on the selection information for one or more data fields acquired from the user may be checked, the message loaded into the checked topic may be read, and the data for the read message based on the checked data loading format may be loaded into the data lake. Specifically, the data may include only a data field selected by a user from among the data fields of the read message.

Also, the processor 1120 may receive a selection signal for a read cycle from a user. In this case, the processor 1120 may read a message loaded into a topic automatically retrieved according to the read cycle after receiving the selection signal for the read cycle.

Meanwhile, the processor 1120 may display the check result of the topic corresponding to the search word.

In addition, the processor 1120 may recommend one or more topics based on the search word in addition to the check result of the topic corresponding to the search word.

Meanwhile, the processor 1120 may display the data loaded into the data lake in the table form.

Also, the processor 1120 may display the data loaded into the data lake in at least one of the grid form and the graphic form.

In addition, the processor 1120 may export the data loaded into the data lake in a form executable by another application.

Meanwhile, the processor 1120 may provide the information associated with the data loading format recently stored before a predetermined time.

In addition, the processor 1120 may provide the information associated with the data recently loaded into the data lake before a predetermined time.

In addition, the processor 1120 may provide the information associated with the topic recently checked before a predetermined time.

Here, the message may be published in response to receiving the event information and loaded on the corresponding topic.

In addition, the processor 1120 may notify that the message has been published. In this case, the message may be read after a subscriber who subscribes to the corresponding topic receives the notification.

In this case, the processor 1120 may broadcast the information associated with the data generated from the read message. Here, the broadcasted information may include the information associated with the data field included in the data, and the user may check the data loaded into the data lake through the broadcasted information.

The electronic apparatus or terminal according to the above-described embodiments may include a processor, a memory that stores and executes program data, a permanent storage such as a disk drive, a communication port that communicates with an external device, a touch panel, a key, a user interface device such as a button, and the like. Methods implemented as software modules or algorithms may be stored on a computer-readable recording medium as computer-readable codes or program instructions executable on the processor. Here, examples of the computer-readable recording medium may include magnetic storage media (for example, a ROM, a RAM, a floppy disk, a hard disk, etc.), optical reading media (for example, a CD-ROM or a digital versatile disc (DVD)), and the like. The computer-readable recording medium may be distributed in computer systems connected to each other through a network, and as a result, the computer-readable codes may be stored and executed in a distributed scheme. The medium may be readable by a computer, stored in a memory, and executed on a processor.

The present embodiment may be represented by functional block configurations and various processing operations. These functional blocks may be implemented by various numbers of hardware and/or software components that execute specific functions. For example, the embodiment may employ integrated circuit configurations, such as a memory, processing, logic, and a look-up table, capable of executing various functions by control of one or more microprocessors or other control devices. Similar to executing the components in software programming or software elements, the present embodiment can be implemented in programming or scripting languages such as python, C, C++, Java, and assembler, including various algorithms implemented by a combination of data structures, processes, routines or other programming configurations. Functional aspects may be implemented in algorithms executed on one or more processors. In addition, the present embodiment may employ a conventional technology for electronic environment setting, signal processing, and/or data processing, and the like. Terms such as "mechanism," "element," "means," and "configuration" may be used broadly and are not limited to mechanical and physical configurations. The terms may include the meaning of a series of routines of software in connection with a processor or the like.

The above-described embodiments are merely examples, and other embodiments may be implemented within the scope of the following claims.

What is claimed is:

1. A method of loading data of a distributed messaging system by an electronic apparatus, the method comprising:
obtaining, from a user computing device, a search word identifying a subset of the data of the distributed messaging system;
in response to obtaining the search word, identifying a topic corresponding to the search word from a plurality of topics;
causing the user computing device to display a plurality of data fields of a message loaded into the topic corresponding to the search word;
obtaining, from the user computing device, information identifying a subset of the plurality of data fields of the message, each data field of the subset of the plurality of data fields of the message corresponding to at least one respective field value in the message;
identifying a data loading format associated with the subset of the plurality of data fields of the message;
reading, based on a read cycle, a portion of the message associated with the subset of the plurality of data fields of the message based on the obtaining of the information identifying the subset of the plurality of data fields of the message, wherein the read cycle is identified based on selection information; and
loading data associated with the portion of the message into a data lake based on the data loading format.

2. The method of claim 1, further comprising:
receiving, from the user computing device, the selection information,
wherein the reading of the portion of the message comprises automatically reading the portion of the message based on the read cycle after the receiving of the selection information.

3. The method of claim 1, further comprising:
obtaining information identifying a second subset of the plurality of data fields of the message, each data field of the second subset of the plurality of data fields of the message not corresponding to at least one respective field value in the message,
wherein the second subset of the plurality of data fields of the message are configured to be locked.

4. The method of claim 1, further comprising:
causing display of a check result of the topic corresponding to the search word.

5. The method of claim 1, further comprising:
outputting a recommendation for one or more topics based on the search word and a check result of the topic corresponding to the search word.

6. The method of claim 1, further comprising:
causing display of the data associated with the portion of the message as information in a table form.

7. The method of claim 1, further comprising:
causing display of the data associated with the portion of the message as at least one of information in a grid form or information in a graphic form.

8. The method of claim 7, wherein the data associated with the portion of the message is displayed as information in a grid form, the information in the grid form comprising first information associated with one or more field values of one or more data fields of the subset of the plurality of data fields and second information identifying one or more portions of the data associated with the portion of the message including a same field value of the one or more field values.

9. The method of claim 1, further comprising:
exporting the data associated with the portion of the message in a form executable by another application.

10. The method of claim 1, further comprising:
in response to a first user interaction, storing the data loading format; and
providing information associated with one or more data loading formats stored within a predetermined time period of obtaining a second user interaction, wherein the one or more data loading formats comprises the data loading format.

11. The method of claim 1, further comprising:
providing information associated with the data associated with the portion of the message within a predetermined time period of obtaining a user interaction.

12. The method of claim 1, wherein the plurality of topics are identified within a predetermined time period prior to the obtaining of the search word, the method further comprising:
providing information associated with the plurality of topics.

13. The method of claim 1, wherein the message is published in response to receiving event information and is loaded into the topic corresponding to the search word.

14. The method of claim 13, further comprising:
providing a notification in response to the message being published,
wherein the reading of the portion of the message comprises reading the portion of the message after a subscriber who subscribes to the topic corresponding to the search word receives the notification.

15. The method of claim 1, further comprising:
broadcasting information associated with data generated from the message.

16. A non-transitory computer-readable recording medium on which a program allowing a computer to execute the method of claim 1 is recorded.

17. An electronic apparatus for loading data of a distributed messaging system, the electronic apparatus comprising:
a memory comprising at least one instruction; and
a processor configured to execute the at least one instruction to:
obtain a search word identifying a subset of the data of the distributed messaging system;

in response to obtaining the search word, identify a topic corresponding to the search word from a plurality of topics;

cause display of a plurality of data fields of a message loaded into the topic corresponding to the search word;

obtain information identifying a subset of the plurality of data fields of the message, each data field of the subset of the plurality of data fields of the message corresponding to at least one respective field value in the message;

identify a data loading format associated with the subset of the plurality of data fields of the message;

read, based on a read cycle, a portion of the message associated with the subset of the plurality of data fields of the message based on the obtaining of the information identifying the subset of the plurality of data fields of the message, wherein the read cycle is identified based on selection information; and load data associated with the portion of the message into a data lake based on the data loading format.

* * * * *